(12) United States Patent
Higuchi et al.

(10) Patent No.: US 12,079,674 B2
(45) Date of Patent: Sep. 3, 2024

(54) LAYING SHEET DISPOSED BETWEEN PRINTING DEVICE AND INSTALLATION SURFACE

(71) Applicant: SEIKO EPSON CORPORATION, Tokyo (JP)

(72) Inventors: Tomoyuki Higuchi, Shiojiri (JP); Kenji Yanagisawa, Azumino (JP); Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/308,330

(22) Filed: Apr. 27, 2023

(65) Prior Publication Data

US 2023/0351135 A1    Nov. 2, 2023

(30) Foreign Application Priority Data

Apr. 28, 2022  (JP) ................. 2022-074403

(51) Int. Cl.
*H04N 1/00*       (2006.01)
*G06K 15/00*      (2006.01)

(52) U.S. Cl.
CPC .......... *G06K 15/40* (2013.01); *G06K 15/005* (2013.01); *H04N 1/00344* (2013.01)

(58) Field of Classification Search
CPC ... G06K 15/40; G06K 15/005; H04N 1/00344
See application file for complete search history.

(56) References Cited

FOREIGN PATENT DOCUMENTS

JP    2022-38279 A    3/2022

OTHER PUBLICATIONS

English Machine Translation of WO 2017-068774-A (Miyazawa, Published Apr. 27, 2021) (Year: 2021).*

* cited by examiner

*Primary Examiner* — Juan M Guillermety
(74) *Attorney, Agent, or Firm* — WORKMAN NYDEGGER

(57) ABSTRACT

A laying sheet is laid between a printing device configured to perform printing on a medium and an installation surface on which the printing device is installed. The laying sheet includes a first surface coming into contact with the installation surface and a second surface being a surface opposite to the first surface. The second surface is provided with at least one mark indicating information relating to the printing device.

7 Claims, 7 Drawing Sheets

LAYING SHEET DISPOSED BETWEEN PRINTING DEVICE AND INSTALLATION SURFACE

The present application is based on, and claims priority from JP Application Serial Number 2022-074403, filed Apr. 28, 2022, the disclosure of which is hereby incorporated by reference herein in its entirety.

BACKGROUND

1. Technical Field

The present disclosure relates to a laying sheet.

2. Related Art

Hitherto, there has been disclosed, as in JP-A-2022-38279, a large-sized printer that is installed on a floor surface in a factory.

However, in order to check information relating to the printer such as an operation procedure of the printer, a user is always required to refer to a manual booklet that is included together with the printer at the time of purchase of the printer or an electronic manual, which is troublesome for a user.

SUMMARY

A laying sheet is laid between a printing device configured to perform printing on a medium and an installation surface on which the printing device is installed, and includes a first surface coming into contact with the installation surface and a second surface being a surface opposite to the first surface. The second surface is provided with at least one mark indicating information relating to the printing device.

DESCRIPTION OF EXEMPLARY EMBODIMENTS

First, a configuration of a laying sheet 1 is described.

For example, the laying sheet 1 is a dedicated sheet configured so that information relating to an installation area Ar100 and an installation position, an operation (working) area AR40, various operation methods, and the like of a printing device 100 or the like can easily be recognized. The printing device 100 of the present exemplary embodiment is a relatively large device that is used in an industrial field or a commercial field.

Figure 1:
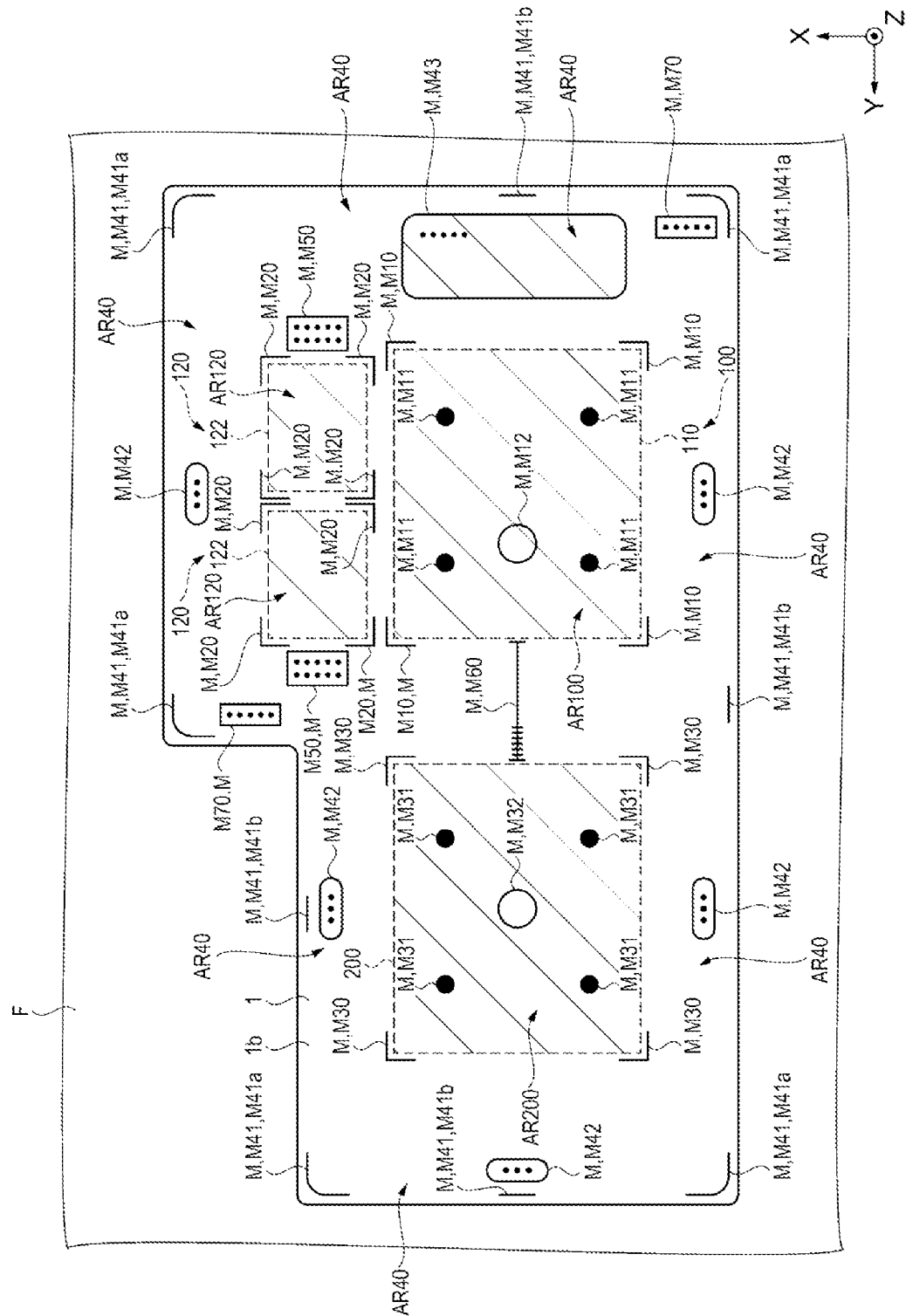
FIG. 1 is a schematic diagram illustrating a configuration of a laying sheet.
Figure 2:
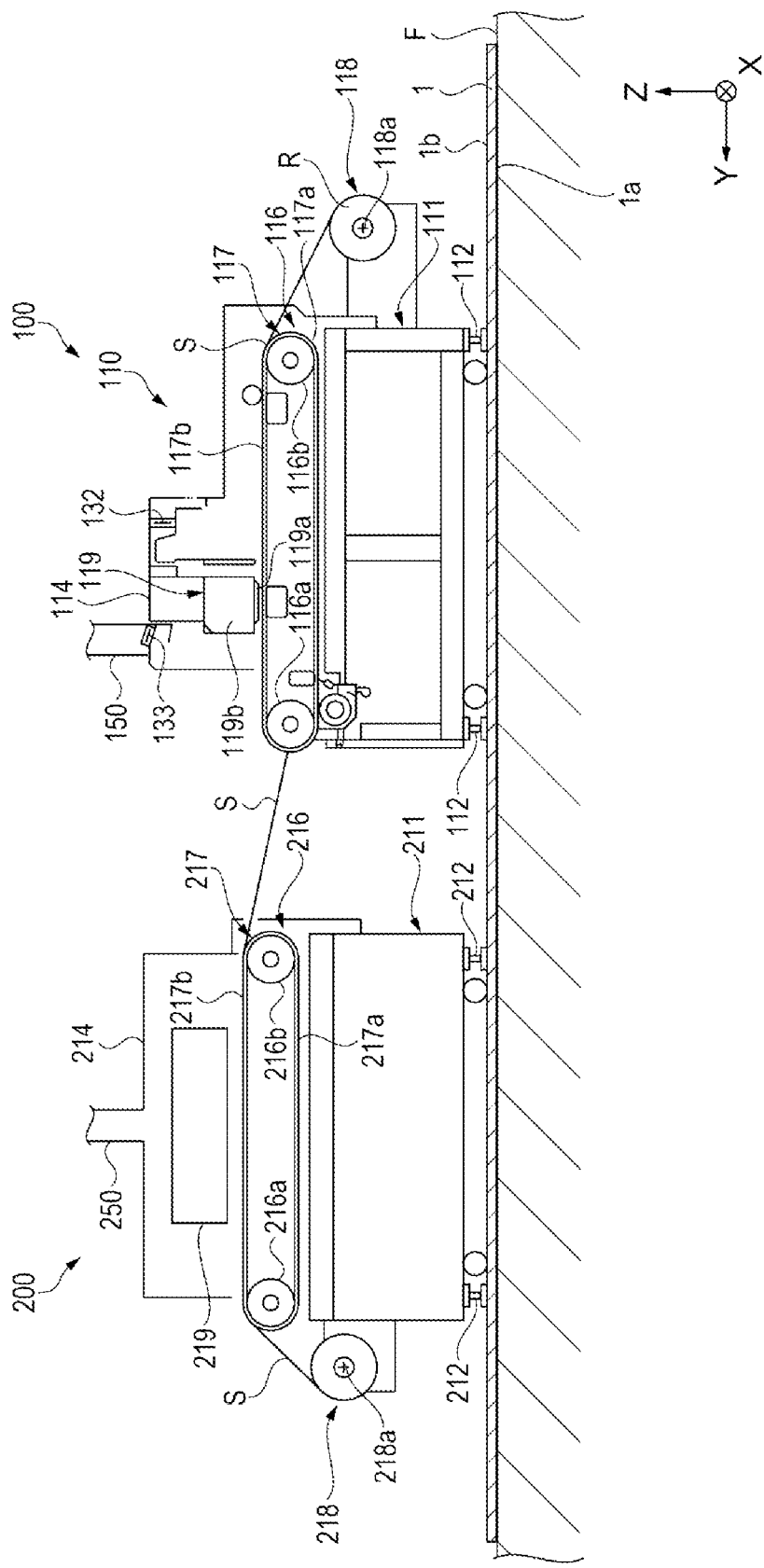
FIG. 2 is a schematic diagram illustrating configurations of a printing device and a drying processing device.

As illustrated in FIG. 1 and FIG. 2, the laying sheet 1 is laid between the printing device 100 that performs printing on a medium S and an installation surface F on which the printing device 100 is installed. For example, the installation surface F is a floor surface in a factory, and has a relatively wide area.

The laying sheet 1 includes a first surface 1a coming into contact with the installation surface F and a second surface 1b being a surface opposite to the first surface 1a. The printing device 100 is installed on the second surface 1b. The second surface 1b is provided with at least one mark M indicating information relating to the printing device 100. For example, the laying sheet 1 has a substantially rectangular shape.

Note that, in the present exemplary embodiment, in addition to the printing device 100, a drying processing device 200 being an example of a processing device is also installed on the second surface 1b of the laying sheet 1, and the second surface 1b is provided with at least one mark M indicating information relating to the drying processing device 200. Note that details of the respective marks M are described alter.

The laying sheet 1 of the present exemplary embodiment has a size including required areas such as the installation area AR100 of the printing device 100, an installation area AR200 of the drying processing device 200, and an operation area AR40 for the printing device 100 and the drying processing device 200. Therefore, the laying sheet 1 is laid on the installation surface F in the factory, a necessary area for installation of the printing device 100 and the like is clearly grasped. Thus, there is no need to measure dimensions of the installation areas AR100 and AR200 of the printing device 100 and the like in advance. Further, the laying sheet 1 is laid on the installation surface F, and hence determination on whether or not the printing device 100 and the like can be installed or can be brought in is facilitated. Thus, convenience can be improved. Moreover, the laying sheet 1 is laid on the installation surface F, and hence the necessary area can easily be secured.

The laying sheet 1 may be formed of one sheet, or may be formed by bonding a plurality of sheets to each other. Note that when the plurality of sheets are bonded to each other, marks for positioning are appropriately provided at positions at which the sheets are bonded to each other. With this, work for bonding the sheets to each other is facilitated.

Next, configurations of the printing device 100 and the drying processing device 200 installed on the laying sheet 1 are described.

The printing device 100 is a device that performs printing on the medium S. Examples of the medium S include fabrics and paper.

Figure 3:
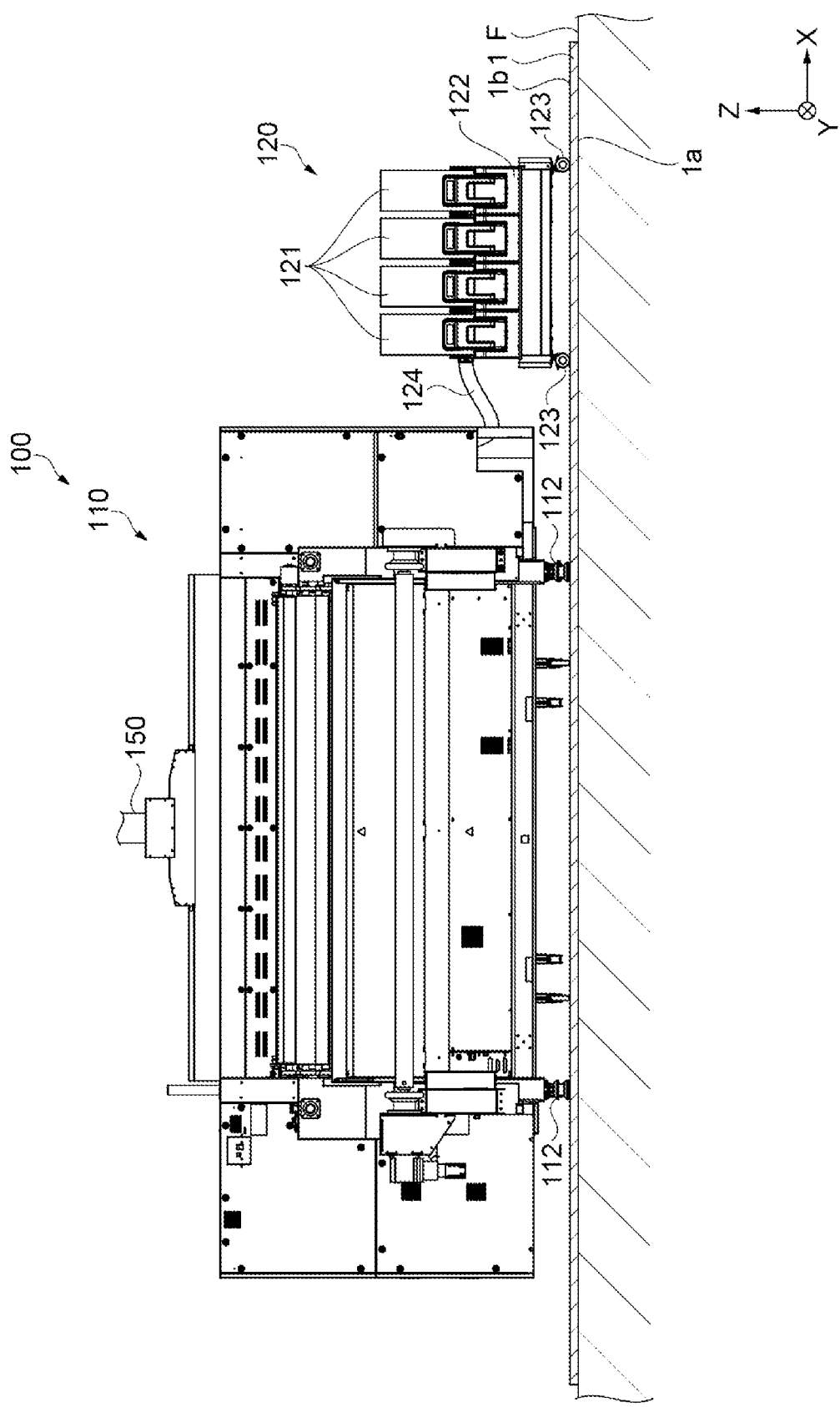
FIG. 3 is a schematic diagram illustrating a configuration of the printing device.

As illustrated in FIG. 2 and FIG. 3, the printing device 100 includes a main body unit 110 and a storage unit 120. Here, a direction along an X axis is a width direction of the printing device 100. A direction along a Y axis is a depth direction of the printing device 100. A direction along a Z axis is a height direction of the printing device 100.

The main body unit 110 of the printing device 100 includes a main body frame 111, a main body cover 114, a transport unit 116, and a recording unit 119.

The main body frame 111 is configured as a base portion in which each unit of the printing device 100 is arranged. At the end of the main body frame 111 in the −Z direction, the plurality of (four in the present exemplary embodiment) leg portions 112 are arranged. The leg portions 112 are installed on the second surface 1b of the laying sheet 1. The leg portions 112 support the respective units of the main body unit 110 including the main body frame 111.

The main body cover 114 is an exterior member that covers the recording unit 119 and the like of the main body unit 110.

The transport unit 116 includes a driving roller 116a, a driven roller 116b, a glue belt 117 stretched around the driving roller 116a and the driven roller 116b, and a medium retaining portion 118.

The medium retaining portion 118 retains a roll body R obtained by winding the medium S having a sheet-like shape in a layered manner. The medium retaining portion 118 includes a retaining shaft 118a that retains the roll body R. Two retaining shafts 118a are arranged in the direction along the X axis. The retaining shaft 118a is configured to be rotatable. Rotation of the retaining shaft 118a draws out the medium S from the roll body R to the glue belt 117 side.

The driving roller 116a rotates, and thus the glue belt 117 moves. Along with movement of the glue belt 117, the medium S can be transported in the +Y direction. In the +Y direction, the driving roller 116a is arranged downstream, and the driven roller 116b is arranged upstream. Further, each of the driving roller 116a and the driven roller 116b includes a rotation shaft in the direction along the X axis.

The glue belt 117 is configured as an endless belt obtained by joining both ends of a flat plate having elasticity. The glue belt 117 is wound around an outer circumferential surface of the driving roller 116a and an outer circumferential surface of the driven roller 116b, and is capable of circularly moving.

An outer circumferential surface 117a of the glue belt 117 has adhesiveness, and is capable of supporting and adsorbing the medium S. The "adhesiveness" refers to a property of be capable of temporarily adhering to other members and allowing peeling-off from an adhesion state.

On the outer circumferential surface 117a, a planar part positioned in the +Z direction between the driving roller 116a and the driven roller 116b is a support surface 117b. In other words, the glue belt 117 includes the support surface 117b. A part of the support surface 117b faces the recording unit 119 in the direction along with the Z axis.

The recording unit 119 is capable of performing printing (recording) on the medium S being transported. The recording unit 119 includes a recording head 119a and a carriage 119b that supports the recording head 119a so that the recording head 119a is capable of reciprocating in the direction along the X axis. The recording unit 119 is arranged above the glue belt 117 (in the −Z direction).

The recording head 119a includes a plurality of nozzles, which are not illustrated, and is arranged so as to face the support surface 117b. The recording head 119a ejects, from the plurality of nozzles, ink being a liquid onto the medium S. With this, recording on the medium S is enabled.

The printing device 100 includes the storage unit 120 that stores the ink, and is configured so that the ink can be supplied from the storage unit 120 to the recording head 119a. The storage unit 120 of the present exemplary embodiment is arranged in the +X direction of the main body unit 110.

The storage unit 120 includes a cartridge 121 capable of storing the ink and a mounting unit 122 to which the cartridge 121 is mounted.

In the present exemplary embodiment, the plurality of cartridges 121 are arranged. Each of the cartridges 121 is a container having a substantially rectangular parallelepiped shape. For example, the ink of different colors is stored in each of the cartridges 121. Each of the cartridges 121 is removably mounted to the mounting unit 122. The mounting unit 122 is arranged under the cartridge 121. The mounting unit 122 includes a locking mechanism, and the mounted cartridge 121 is fixed by setting the locking mechanism. When the mounting unit 122 is mounted to the cartridge 121, the ink can be supplied to the recording head 119a via a tube 124. Meanwhile, when the locking mechanism is canceled, the mounting unit 122 can be removed from the cartridge 121.

At the end of the −Z direction in the mounting unit 122, the plurality of (four in the present exemplary embodiment) leg portions 123 are arranged. The leg portions 123 are installed on the second surface 1b of the laying sheet 1. The leg portions 123 support the cartridge 121 and the mounting unit 122.

Note that, in the present exemplary embodiment, two storage units 120 are arranged.

A plurality of fans 132 and 133 are arranged in the main body cover 114. Further, at the end of the main body cover 114 in the +Z direction, a duct portion 150 is arranged. The duct portion 150 is a duct for discharging air inside the main body cover 114, and for example, is coupled to an exhaust device provided to a ceiling part of the factory. The fan 132 being one of the plurality of fans 132 and 133 is arranged on a side of the recording head 119a in the −Y direction, and the fan 133 being the other one is arranged on a side of the recording head 119a in the +Y direction. The duct portion 150 is arranged above the fan 133. Then, when the fans 132 and 133 are rotated by a motor, which is not illustrated, the air inside the main body cover 114 flows to the duct portion 150, and is discharged to the exhaust device via the duct portion 150. Therefore, ink mist being part of the ink ejected from the recording head 119a, dust inside the main body cover 114, and the like can be discharged to the outside. Exhaust collected by the exhaust device is purified, and is released to the outside of the factory from the exhaust device.

Next, a configuration of the drying processing device 200 is described.

The drying processing device 200 is a device that dries the medium S discharged from the printing device 100. The drying processing device 200 is arranged downstream of the printing device 100 in the transport direction (the +Y direction), and dries the medium S to which the printing device 100 applies the ink.

The drying processing device 200 includes a main body frame 211, a main body cover 214, a transport unit 216, and a drying processing unit 219.

The main body frame 211 is configured as a base portion in which each unit of the drying processing device 200 is arranged. At the end of the main body frame 211 in the −Z direction, the plurality of (four in the present exemplary embodiment) leg portions 212 are arranged. The leg portions 212 are installed on the second surface 1b of the laying sheet 1. The leg portions 212 support the respective units including the main body frame 211.

The main body cover 214 is an exterior member that covers the drying processing unit 219 and the like.

The transport unit 216 includes a driving roller 216a, a driven roller 216b, a belt 217 stretched around the driving roller 216a and the driven roller 216b, and a medium winding unit 218.

The driving roller 216a rotates, and thus the belt 217 moves. Along with movement of the belt 217, the medium S can be transported in the +Y direction. In the +Y direction, the driving roller 216a is arranged downstream, and the driven roller 216b is arranged upstream. Further, each of the driving roller 216a and the driven roller 216b includes a rotation shaft in the direction along the X axis.

On an outer circumferential surface 217a of the belt 217, a planar part positioned in the +Z direction between the driving roller 216a and the driven roller 216b is a support surface 217b.

The drying processing unit 219 is arranged above the support surface 217b. The drying processing unit 219 dries the medium S. For example, the drying processing unit 219 is an AC electric field generation unit. Specifically, the AC electric field generation unit generates an AC electric field, and thus executes processing of heating moisture contained in the medium S and reducing a moisture amount contained in the medium S. In other words, the AC electric field generation unit heats the ink applied onto the medium S supported on the support surface 217b, and thus dries the medium S.

The medium winding unit 218 winds the medium S being transported. The medium winding unit 218 includes a winding shaft 218a for winding the medium S. The winding shaft 218a is configured to rotatable. Along with rotation of the winding shaft 218a, the medium S after drying processing is wound.

At the end of the main body cover 214 in the +Z direction, a duct portion 250 is arranged. The duct portion 250 is a duct for discharging air inside the main body cover 214, and for example, is coupled to an exhaust device provided to a ceiling part of the factory. Steam or the like that stagnates inside the main body cover 214 at the time of drying the medium S is discharged to the outside via the duct portion 250. With this, an environment inside the main body cover 214 (temperature and humidity) can be maintained at a constant level.

Next, the marks M provided at the laying sheet 1 are described.

As illustrated in FIG. 1, the marks M are formed at the second surface 1b of the laying sheet 1. For example, the mark M is formed as a text of characters, an image, a diagram (including illustrations), or a symbol. The color tone of the mark M may be different from the color tone of the second surface 1b of the laying sheet 1. For example, the second surface 1b of the laying sheet 1 is entirely in white, and the mark M is formed in a black-based color, a gray-based color, a blue-based color, or the like. With this, contrast is generated, and thus a user easily recognizes the mark M. Further, there may be adopted a configuration in which the color tone is different for each mark M.

Here, the marks M are described.

The mark M includes at least one printing device installation mark M10.

The printing device installation mark M10 is a mark (sign) indicating the installation area AR100 for installing the printing device 100 and the installation position of the printing device 100. The printing device installation mark M10 is arranged so as to surround the installation area AR100 of the printing device 100. The printing device installation mark M10 of the present exemplary embodiment has an L-like shape, and defines the installation area AR100 of the printing device 100. The plurality of printing device installation marks M10 are formed in conformity with the outer shape of the printing device 100. For example, the printing device installation marks M10 are provided in conformity of four corners of the outer shape of the printing device 100. In the present exemplary embodiment, the printing device installation marks M10 are formed at positions corresponding to the end in the +X direction and the end in the −X direction at the end of the printing device 100 in the +Y direction, and at positions corresponding to the end in the +X direction and the end in the −X direction at the end of the printing device 100 in the −Y direction. With this, a guide for the size and the installation position of the installation area AR100 can easily be grasped. Further, the printing device 100 can easily be installed at an appropriate position.

Note that the printing device installation mark M10 is only required to clarify the installation area AR100 of the printing device 100 and the installation position thereof. For example, the printing device installation mark M10 may be a frame line formed of one line defining the installation area AR100 of the printing device 100, or the entire installation area AR100 may be indicated and identified with a color different from that of the second surface 1b. Further, the formation position, the number of marks formed, the color tone, and the like of the printing device installation mark M10 may be set as appropriate.

Further, the mark M includes at least one leg portion installation position mark M11.

The leg portion installation position mark M11 is a mark indicating a position at which the leg portion 112 of the printing device 100 is installed.

The leg portion installation position mark M11 of the present exemplary embodiment is a black circle (●). The plurality of (four in the present exemplary embodiment) leg portion installation position marks M11 are formed in accordance with the leg portions 112 of the printing device 100. With this, a guide for the positions for installing the leg portions 112 of the printing device 100 can easily be grasped. Further, the printing device 100 can easily be installed at an appropriate position. Further, the printing device 100 is installed while following the printing device installation mark M10 and the leg portion installation position mark M11, and thus installation work can efficiently be performed.

Note that the leg portion installation position mark M11 may be set as appropriate in accordance with the number, the positions, and the like of the leg portions 112.

Further, the mark M includes a duct portion position mark M12.

The duct portion position mark M12 is a mark indicating a position of the duct portion 150 of the printing device 100. The duct portion position mark M12 is formed at a position corresponding to the −Z direction of the duct portion 150 when the printing device 100 is installed in the installation area AR100.

The duct portion position mark M12 of the present exemplary embodiment is a white circle (○). With this, with the duct portion position mark M12 as a reference, a coupling position to the exhaust device provided to the ceiling part of the factory can be checked. Specifically, before introducing the printing device 100, a position at which a whole or the like is formed in the ceiling part of the factory can be examined.

Further, the mark M includes a storage unit installation mark M20.

The storage unit installation mark M20 is a mark indicating an installation area AR120 for installing the storage unit 120 and the installation position of the storage unit 120. The storage unit installation mark M20 is arranged so as to surround the installation area AR120 of the storage unit 120. The storage unit installation mark M20 of the present exemplary embodiment has an L-like shape, and defines the installation area AR120 of the storage unit 120. The plurality of the storage unit installation mark M20 are formed in accordance with the outer shapes of the respective storage units 120. For example, the storage unit installation marks M20 are provided in conformity of four corners of the outer shape of the mounting unit 122. In the present exemplary embodiment, the storage unit installation marks M20 are formed at positions corresponding to the end in the +X direction and the end in the −X direction at the end of each of the mounting units 122 in the +Y direction and at positions corresponding to the end in the +X direction and the end in the −X direction at the end of each of the mounting units 122 in the −Y direction. With this, a guide for the size and the installation position of each installation area AR120 can easily be grasped. Further, each of the storage units 120 can easily be installed at an appropriate position. Note that the formation position, the number of marks formed, the color tone, and the like of the storage unit installation mark M20 may be set as appropriate.

Further, the mark M includes at least one processing device installation mark M30.

The processing device installation mark M30 is a mark indicating the installation area AR200 for installing the drying processing device 200 and the installation position thereof. The processing device installation mark M30 is arranged so as to surround the installation area AR200 of the drying processing device 200. The processing device installation mark M30 of the present exemplary embodiment has an L-like shape, and defines the installation area AR200 of the drying processing device 200. The plurality of the processing device installation mark M30 are formed in accordance with the outer shape of the drying processing device 200. For example, the processing device installation marks M30 are provided in conformity of four corners of the outer shape of the drying processing device 200. In the present exemplary embodiment, the processing device installation marks M30 are formed at positions corresponding to the end in the +X direction and the end in the −X direction at the end of the drying processing device 200 in the +Y direction and at positions corresponding to the end in the +X direction and the end in the −X direction at the drying processing device 200 in the −Y direction. With this, a guide for the size and the installation position of the installation area AR200 can easily be grasped. Further, the drying processing device 200 can easily be installed at an appropriate position.

Note that the processing device installation mark M30 is only required to clarify the installation area AR200 of the drying processing device 200 and the installation position thereof. For example, the processing device installation mark M30 may be a frame line formed of one line defining the installation area AR200 of the drying processing device 200, or the entire installation area AR200 may be indicated and identified with a color different from that of the second surface 1b. Further, the formation position, the number of marks formed, the color tone, and the like of the processing device installation mark M30 may be set as appropriate.

Further, the mark M includes at least one leg portion installation position mark M31.

The leg portion installation position mark M31 is a mark indicating a position for installing the leg portion 212 of the drying processing device 200.

The leg portion installation position mark M31 of the present exemplary embodiment is a black circle (●). The plurality of (four in the present exemplary embodiment) leg portion installation position marks M31 are formed in accordance with the leg portions 212 of the drying processing device 200. With this, a guide for the positions for installing the leg portions 212 of the drying processing device 200 can easily be grasped. Further, the drying processing device 200 can easily be installed at an appropriate position. Further, the drying processing device 200 is installed while following the processing device installation mark M30 and the leg portion installation position mark M31, and thus installation work can efficiently be performed.

Note that the leg portion installation position mark M31 may be set as appropriate in accordance with the number, the positions, and the like of the leg portions 212.

Further, the mark M includes at least one duct portion position mark M32.

The duct portion position mark M32 is a mark indicating a position of the duct portion 250 of the drying processing device 200. The duct portion position mark M32 is formed at a position corresponding to the −Z direction of the duct portion 250 when the drying processing device 200 is installed in the installation area AR200.

The duct portion position mark M32 of the present exemplary embodiment is a white circle (○). With this, with the duct portion position mark M32 as a reference, a coupling position to the exhaust device provided to the ceiling part of the factory can be checked. Specifically, before introducing the drying processing device 200, a position at which a whole or the like is formed in the ceiling part of the factory can be examined.

Further, the mark M includes operation area marks M41 (M41a, M41b), M42, and M43.

The operation area marks M41 (M41a, M41b), M42, and M43 are marks indicating the operation area AR40 for a user to operate the printing device 100 and the drying processing device 200.

The plurality of operation area marks M41 are provided along the outer peripheral portion of the laying sheet 1. Specifically, the operation area mark M41a having an L-like shape along a corner portion of the laying sheet 1 is formed at the corner portion of the laying sheet 1. Further, between the plurality of operation area marks M41a provided at the respective corner portions of the laying sheet 1, the operation area marks M41b having a linear shape are formed. For example, the operation area marks M41a and M41b have a blue-based color. With this, a guide for the operation area AR40 for operating the printing device 100 and the drying processing device 200 can easily be grasped.

Further, for example, there is no need to install a pole or the like for clearly indicating the operation area AR40, and a work environment can be prevented from being complicated.

Note that the operation area mark M41 may be formed of one line along the outer peripheral portion of the laying sheet 1 so that the operation area mark M41 defines the operation area AR40.

The plurality of operation area marks M42 are provided along the outer peripheral portion of the laying sheet 1. Specifically, the operation area marks M42 are arranged in the +X direction and the −X direction of the printing device 100 and the +X direction, the −X direction, and the +Y direction of the drying processing device 200.

Figure 4:
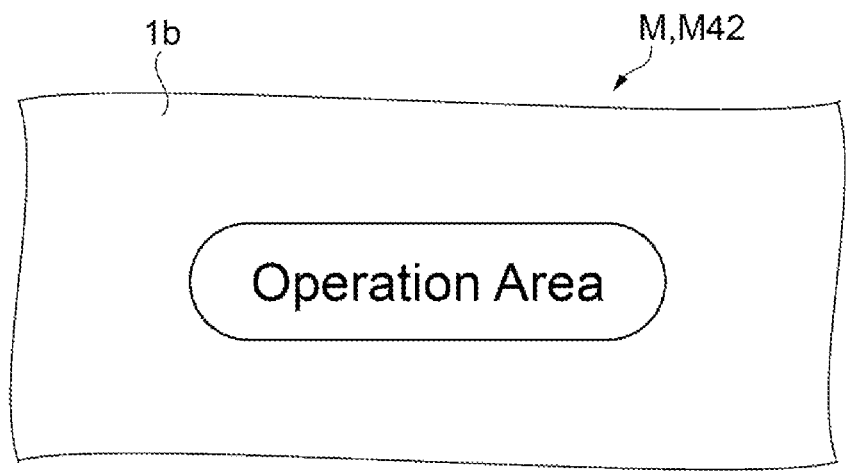
FIG. 4 is a diagram illustrating an operation area mark.

As illustrated in FIG. 4, in the operation area mark M42, an indication that the area is the operation area AR40 is formed in the form of a sentence or a message written in a discretionally selected language. Note that the language used for the operation area mark M42 is not particularly limited, and may be a mother language of a nation in which the laying sheet 1 is installed, for example. Further, the operation area mark M42 may contain a diagram or the like, in addition to a sentence or a message. The operation area mark M42 of the present exemplary embodiment contains an elongated circle and a word formed in a region surrounded by the elongated circle. For example, the operation area mark M42 has a black-based color. The operation area mark M42 has such a size that a user can easily visually recognize the mark at the laying sheet 1. With this, a guide for the operation area AR40 for operating the printing device 100 and the drying processing device 200 can easily be grasped.

The operation area mark M43 is arranged in the −Y direction of the printing device 100 (the retaining shaft 118a of the main body unit 110).

Figure 5:
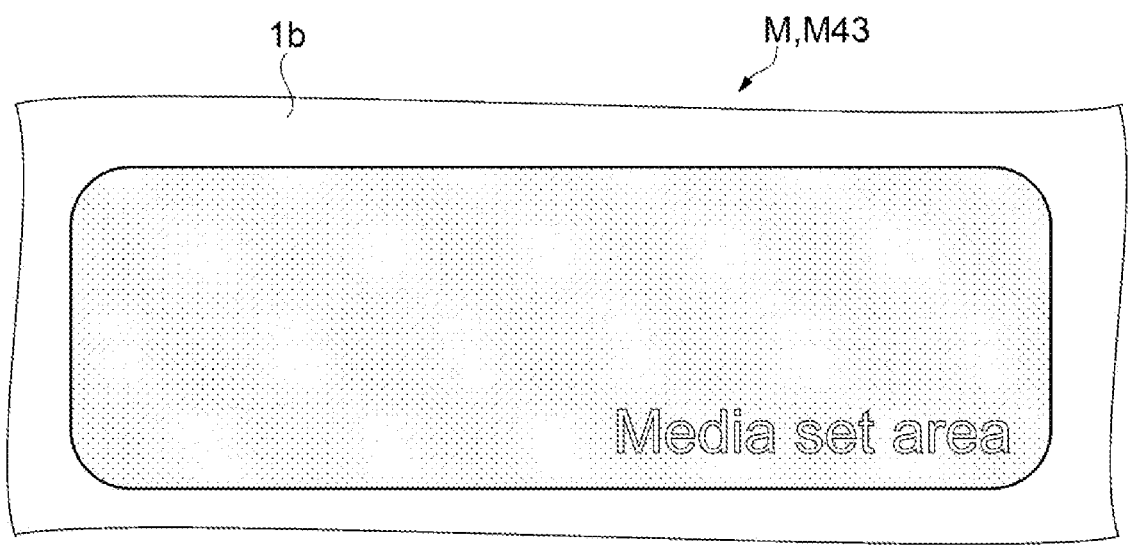
FIG. 5 is a diagram illustrating another operation area mark.

As illustrated in FIG. 5, the operation area mark M43 indicates, in the form of a sentence or a message written in a discretionally selected language, the operation area AR40 for placing the roll body R on the retaining shaft 118a, the roll body R being obtained by winding the medium S in a layered manner. Note that the language used for the operation area mark M43 is not particularly limited. The operation area mark M43 of the present exemplary embodiment contains a diagram or the like, in addition to a sentence or a message. Specifically, the operation area mark M43 contains an elongated circle having a gray-based color and an outlined sentence or message formed in a region surrounded by the elongated circle. The dimension of the operation area mark M43 is relatively large, and the dimension of the operation area mark M43 along the X axis is substantially the same as the distance dimension between the retaining shafts 118a. Further, the dimension of the operation area mark M43 in the direction along the Y axis is a dimension from the end of the main body unit 110 in the −Y direction to the operation area mark M41b. With this, an area for the placing operation of the medium S (the roll body R) can easily be grasped. Further, a safe area is secured, and thus a user can be prevented from coming into contact with the main body unit 110 or the like.

Further, the mark M includes a storage unit operation mark M50.

Figure 6A:
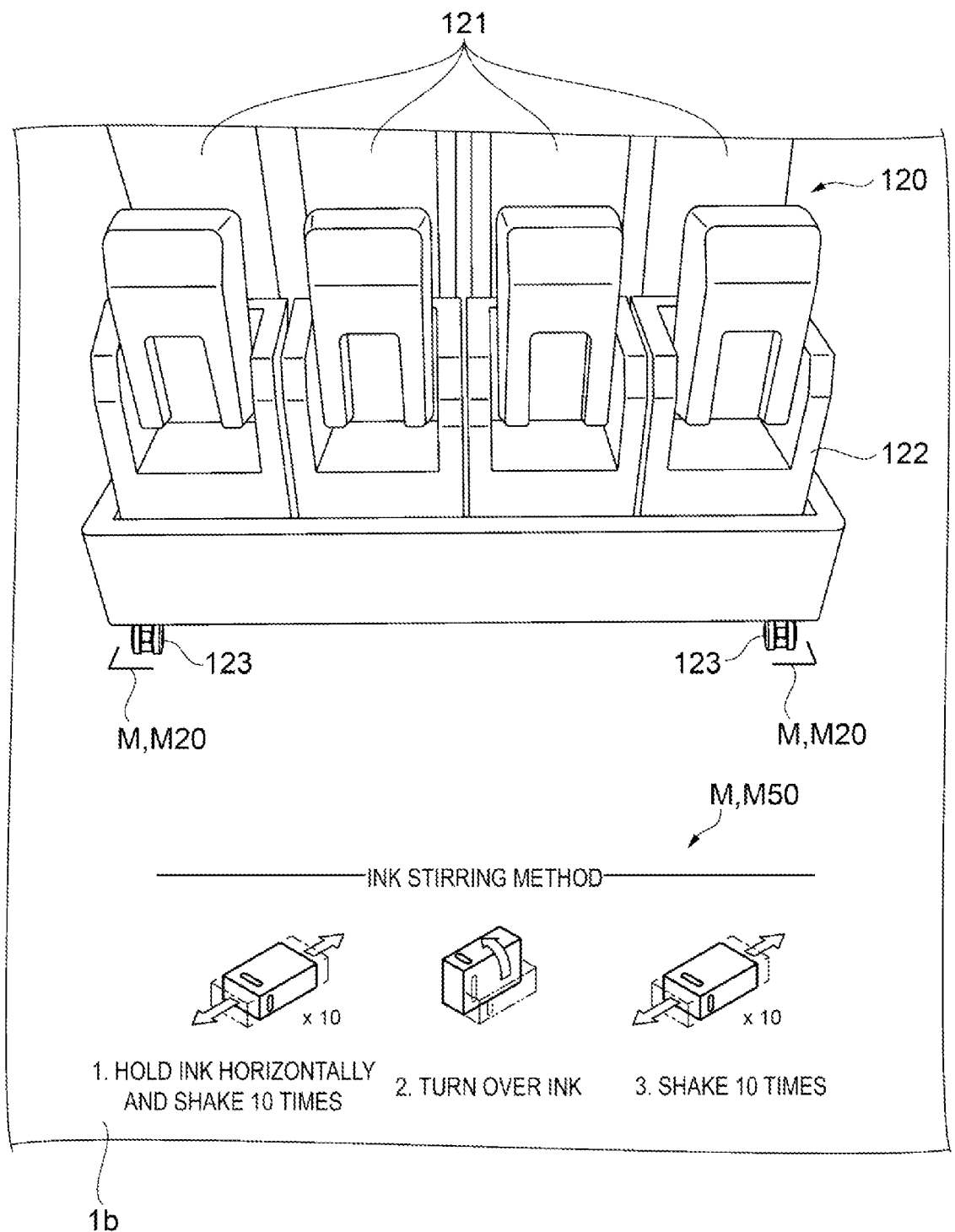
FIG. 6A is a schematic diagram illustrating a configuration of a periphery of a storage unit.
Figure 6B:
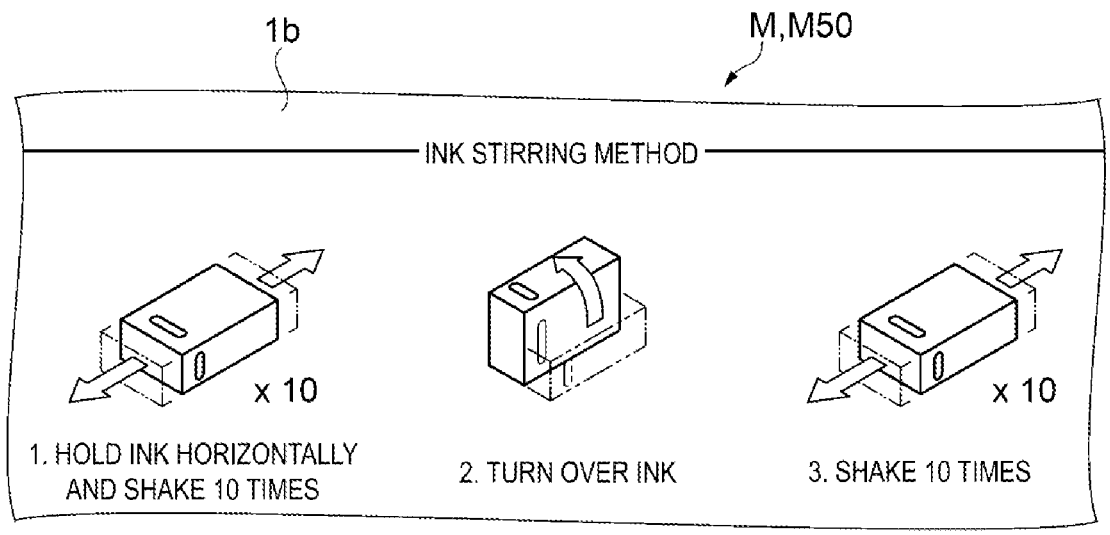
FIG. 6B is a diagram illustrating a storage unit operation mark.

As illustrated in FIG. 6A and FIG. 6B, the storage unit operation mark M50 is a mark indicating an operation procedure of the storage unit 120. The storage unit operation mark M50 is provided for each of the two storage units 120. For the storage unit 120 of the two storage units 120, which is arranged on the side in the −Y direction, the storage unit operation mark M50 is arranged in the −Y direction of the storage unit 120. Further, for the storage unit 120 of the two storage units 120, which is arranged on the side in the +Y direction, the storage unit operation mark M50 is arranged in the +Y direction of the storage unit 120. Therefore, a user is allowed to recognize the storage unit operation mark M50 in a state of orienting to each of the storage units 120. With this, work can be performed while looking at the storage unit operation mark M50.

The operation procedure indicated with the storage unit operation mark M50 in the present exemplary embodiment is a stirring method of the ink stored in the cartridge 121. In the storage unit operation mark M50 of the present exemplary embodiment, there is formed an indication that the ink is to be stirred by shaking, in one direction and the other direction, the cartridge 121 taken out from the mounting unit 122 with the cartridge 121 held horizontally, then turning over the cartridge 121, and shaking the cartridge again in the one direction and the other direction. The storage unit operation mark M50 is formed of a diagram (including illustration) and a sentence. For example, the storage unit operation mark M50 has a black-based color. The storage unit operation mark M50 has such a size that a user can easily visually recognize the mark at the laying sheet 1. With this, a user is allowed to easily grasp the ink stirring method. In this manner, there is no need to check a manual or a guidance each time, and an operation efficiency can be improved.

Note that, in addition to the storage unit operation mark M50, there may be provided operation marks indicating other operation procedures such as a method of placing the medium S in the printing device 100 or maintenance methods of the recording head 119a and the like. Further, the language in which a sentence contained in the storage unit operation mark M50 is expressed is not particularly limited.

Further, the mark M (the processing device installation mark M30) includes a scale mark M60.

Figure 7:
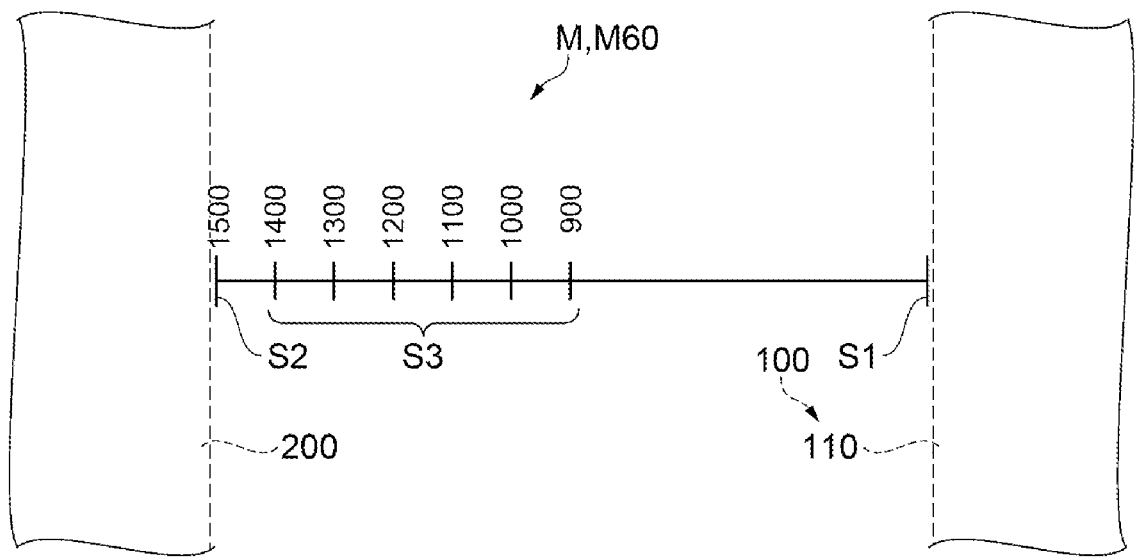
FIG. 7 is a diagram illustrating a scale mark.

As illustrated in FIG. 7, the scale mark M60 is a mark having a scale in which at least one numerical value is drawn, the at least one numerical value indicating the installation distance between the printing device 100 (the main body unit 110) and the drying processing device 200. The scale mark M60 is a mark for grasping a distance between the end of the printing device 100 (the main body unit 110) in the +Y direction and the end of the drying processing device 200 in the −Y direction. The scale mark M60 shows a recommendation value of the distance between the main body unit 110 and the drying processing device 200. The scale mark M60 of the present exemplary embodiment contains a scale and numerical values corresponding to the scale. Specifically, one scale S1 indicating the end of the printing device 100 in the +Y direction, one scale S2 indicating the end of the drying processing device 200 in the −Y direction, and a plurality of scales S3 provided between the scale S1 and the scale S2 are contained. A dimension of the scale S1 in the X direction is equal to a dimension of the scale S2 in the X direction. Further, a dimension of the plurality of scales S3 in the X direction is smaller than the dimensions of the scale S1 and the scale S2 in the X direction. In the present exemplary embodiment, the minimum value of the distance between the main body unit 110 and the drying processing device 200 is 900 mm. Further, in the present exemplary embodiment, the maximum value of the distance between the main body unit 110 and the drying processing device 200 is 1,500 mm. In other words, a distance between the scale S1 and the scale S2 is 1,500 mm. Therefore, in the present exemplary embodiment, characters indicating 1,500 mm are shown at a position corresponding to the scale S2, and characters indicating 900 mm are shown at a position corresponding to a scale S3 at the farthest position in the −Y direction of the plurality of scales S3. Further, in the present exemplary embodiment, the distance from 900 mm to 1,500 mm is indicated at intervals of 100 mm. Therefore, the number of plurality of scales S3 is six. With this, a user is allowed to easily grasp the installation distance between the printing device 100 and the drying processing device 200 with the numerical value drawn in the scale mark M60 as a guide, without measuring the distance between the main body unit 110 and the drying processing device 200.

Further, the mark M includes a device name mark M70.

Figure 8:
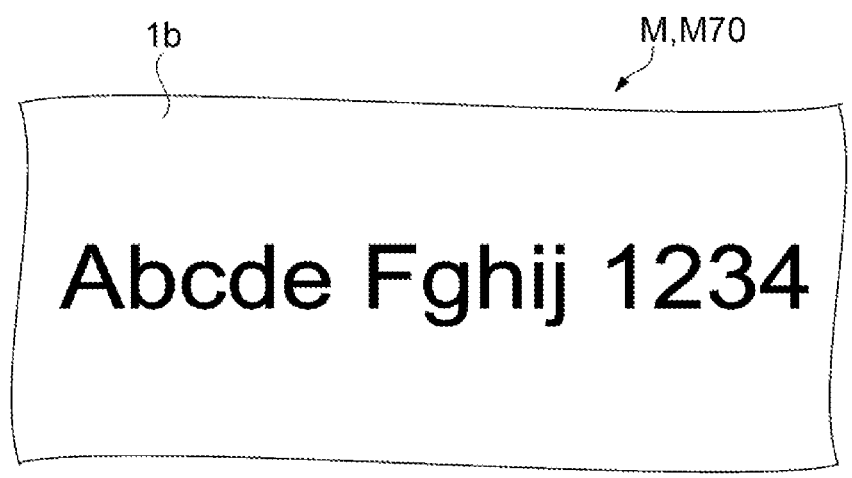
FIG. 8 is a diagram illustrating a device name mark.

As illustrated in FIG. 8, for example, the device name mark M70 is a mark indicating a device name or a model name of the printing device 100 installed on the laying sheet 1.

The plurality of device name marks M70 are arranged in the periphery of the printing device 100. For example, the device name mark M70 has a black-based color. The device name mark M70 has such a size that a user can easily visually recognize the mark at the laying sheet 1. With this, for example, when a user makes an inquiry to a call center or the like from the periphery of the printing device 100, a device name or a model name can easily be communicated.

Note that the marks M may be printed directly on the second surface 1*b* of the laying sheet 1. Alternatively, the marks M are formed and printed in a label form, and the label on which the mark M is formed may be attached on the second surface 1*b*.

The laying sheet 1 may have solvent resistance and friction resistance. With this, an ink stain that unintentionally adheres to the second surface 1*b* can be wiped off, and a clean environment can be maintained. Therefore, there is no need to additionally prepare for a protection sheet or the like, which saves time and labor. Further, a blur or a scratch of the marks M can be suppressed.

Further, the marks M may be subjected to surface treatment such as surface coating and laminating. With this, a scratch or the like of the marks M can be suppressed.

Further, the marks M may be configured to be replaceable in a label form or the like. For example, a label on which the mark M is formed is newly attached on a scratched mark M, and thus the mark M can easily be repaired.

Further, the color of the second surface 1*b* of the laying sheet 1 may not be white. For example, a color tone conforming to a corporate color of a client may be adopted. With this, a sense of unity can be obtained in the factory.

Further, for example, the device name mark M70 may be provided in the installation area AR100 in which the printing device 100 is installed. For example, a mark M indicating a device name or a model name of the drying processing device 200 may be provided in the installation area AR200 in which the drying processing device 200 is installed. In this manner, in which of the areas the printing device 100 or the drying processing device 200 is to be installed can easily be determined.

Further, the mark M may include a mark indicating installation orientations of the printing device 100 and the drying processing device 200. For example, an arrow mark is provided on the second surface 1*b* in accordance with the transport (discharge) direction of the medium S of the printing device 100. With this, the installation directions of the printing device 100 and the drying processing device 200 can easily be grasped.

Next, a usage method of the laying sheet 1 is described.

First, the laying sheet 1 is laid on the installation surface F in the factory. The marks M are provided on the second surface 1*b* of the laying sheet 1, and thus the entire area including the installation areas AR100, AR120, and AR200 of the printing device 100, the storage unit 120, and the drying processing device 200 and the operation area AR40 are clarified.

Further, a position at which a hole is formed in the ceiling can be determined with the duct portion position marks M12 and M32 as references, and thus hole formation work can be performed.

Subsequently, the printing device 100 and the drying processing device 200 are installed while following the marks M. The main body unit 110 of the printing device 100 is installed in conformity with the printing device installation mark M10 and the leg portion installation position mark M11. With this, the main body unit 110 can securely be installed in the installation area AR100. Further, the storage unit 120 is installed in conformity with the storage unit installation mark M20. With this, the storage unit 120 can securely be installed in the installation area AR120. Further, the drying processing device 200 is installed in conformity with the processing device installation mark M30 and the leg portion installation position mark M31. With this, the drying processing device 200 can securely be installed in the installation area AR200. Further, the installation distance between the printing device 100 and the drying processing device 200 is set while referring to the scale mark M60. Further, each of the duct portions 150 and 250 is coupled to the exhaust device.

After that, in the operation area AR40 indicated with the operation area marks M41, M42, and M43, operations of the printing device 100 and the drying processing device 200 or work is performed. Further, when the ink in the cartridge 121 is stirred, the work is performed while looking at the storage unit operation mark M50. Further, in a case in which an inquiry is made to a call center, when the device name of the printing device 100 is to be communicated, the device name can easily be communicated by looking at the device name mark M70. Further, when the ink adheres to the operation area AR40, the ink is wiped off.

Note that the usage method of the laying sheet 1, which is described above, may be shown on the second surface 1*b* of the laying sheet 1.

As described above, according to the present exemplary embodiment, a user refers to the marks M provided on the second surface 1*b* of the laying sheet 1, and thus is allowed to easily check the information relating to the printing device 100 and the drying processing device 200. With this, a user does not always have to check a manual, and thus convenience for a user is improved. Further, an operation efficiency can be improved, and a safe and clean working environment can be provided and maintained.

Contents derived from the exemplary embodiments are described below.

A laying sheet is laid between a printing device configured to perform printing on a medium and an installation surface on which the printing device is installed, and includes a first surface coming into contact with the installation surface and a second surface being a surface opposite to the first surface. The second surface is provided with at least one mark indicating information relating to the printing device.

With this configuration, a user is allowed to easily check the information relating to the printing device by referring to the mark provided on the second surface of the laying sheet. With this, a user does not always have to check a manual, and thus convenience for a user is improved.

The at least one mark at the laying sheet may include an operation area mark indicating an operation area for a user to operate the printing device.

With this configuration, a user is allowed to easily grasp a guide for the operation area for operating the printing device.

The at least one mark at the laying sheet may include a printing device installation mark indicating an installation area for installing the printing device.

With this configuration, a user is allowed to easily grasp a guide for the position for installing the printing device.

The at least one mark at the laying sheet may include a processing device installation mark indicating an installation area of a processing device with respect to the printing device, the processing device being configured to subject the media discharged from the printing device to processing.

With this configuration, a user is allowed to easily grasp a guide for the installation position of the processing device with respect to the printing device.

The processing device installation mark at the laying sheet may include a scale mark in which at least one numerical value is drawn, the at least one numerical value indicating an installation distance between the printing device and the processing device.

With this configuration, a user is allowed to easily grasp the installation distance between the printing device and the processing device, with the numerical value drawn in the scale mark as a guide.

The at least one mark at the laying sheet may include a storage unit installation mark indicating an installation area for a storage unit configured to store a liquid used for the printing on the medium.

With this configuration, a user is allowed to easily grasp a guide for the installation position of the storage unit.

The at least one mark at the laying sheet may include a storage unit operation mark indicating an operation procedure of the storage unit.

With this configuration, a user is allowed to easily grasp an operation of the storage unit.

What is claimed is:

1. A laying sheet laid between a printing device configured to perform printing on a medium and an installation surface on which the printing device is installed, the laying sheet comprising:
   a first surface coming into contact with the installation surface; and
   a second surface being a surface opposite to the first surface, wherein
   the printing device is installed directly on the second surface of the laying sheet, and
   the second surface is provided with an area mark, within and on which the printing device is installed, and at least one mark including a leg installation position, at which a leg of the printing device is installed, within the area mark.

2. The laying sheet according to claim 1, wherein
the at least one mark includes an operation area mark indicating an operation area for a user to operate the printing device.

3. The laying sheet according to claim 1, wherein
the at least one mark includes a printing device installation mark indicating an installation area for installing the printing device.

4. The laying sheet according to claim 1, wherein
the at least one mark includes a processing device installation mark indicating an installation area of a processing device with respect to the printing device, the processing device being configured to subject the media discharged from the printing device to processing.

5. The laying sheet according to claim 4, wherein
the processing device installation mark includes a scale mark in which at least one numerical value is drawn, the at least one numerical value indicating an installation distance between the printing device and the processing device.

6. The laying sheet according to claim 1, wherein
the at least one mark includes a storage unit installation mark indicating an installation area for a storage unit configured to store a liquid used for the printing on the medium.

7. The laying sheet according to claim 6, wherein
the at least one mark includes a storage unit operation mark indicating an operation procedure of the storage unit.

* * * * *